3,310,413
ALUMINOSILICATE GLASS

Roy V. Harrington, Corning, N.Y., assignor to Corning Glass Works, Corning, N.Y., a corporation of New York
No Drawing. Filed Jan. 17, 1963, Ser. No. 252,046
5 Claims. (Cl. 106—54)

This invention relates to low expansion aluminosilicate glasses which are particularly suitable for forming glass to metal seals with metals such as molybdenum. Such glass to metal seals find use in the electronics industry in the manufacture of electronic tubes and the like.

In the manufacture of glasses suitable for such uses, certain considerations must be met. For example, the thermal expansivity of the glass must approximate that of the metal to which it is to be sealed. In the case of molybdenum metal, the sealing glass should have an average coefficient of linear thermal expansion of between $44 \times 10^{-7}$ and $50 \times 10^{-7}$ per °C. in the range between 0° C. and 300° C. In addition, a suitable glass should exhibit a relatively high electrical resistivity and good chemical durability.

It is known that certain glasses in the six component system $CaO$–$MgO$–$BaO$–$Al_2O_3$–$B_2O_3$–$SiO_2$ are capable of being satisfactorily sealed to molybdenum. Previous investigations of this system have resulted in the commercial use of a glass having the composition, in weight percent, of 58% $SiO_2$, 15% $Al_2O_3$, 4.0% $B_2O_3$, .9% $CaO$, 7.1% $MgO$ and 6.0% $BaO$. This particular composition produces an excellent glass for use in molybdenum to glass seals. However, commercial melting experience has shown certain disadvantages which tend to increase cost and limit the usefulness of the glass. In particular, a high liquidus temperature (about 1140° C.) and a low viscosity at the liquidus temperature (about 18,000 poises) limits the working range of the glass and, in production, frequently results in costly losses due to devitrification.

Furthermore, the production of relatively large tubing used for the manufacture of larger electron tubes, for example, 2 to 3 inches in diameter, is difficult because of the low viscosity at which the glass must be worked. The larger the tubing to be drawn, the higher must be the viscosity of the glass at working temperature to permit proper manipulation of the glass. In order to minimize production losses resulting from devitrification and to permit the drawing of larger diameter tubing, it is desirable that the glass employed have a liquidus temperature less than about 1125° C. and a viscosity of about 30,000 poises or greater at liquidus temperature.

It is an object of this invention to provide glasses, suitable for forming seals with molybdenum, which overcome the aforementioned difficulties. It is a further object of this invention to provide substantially alkali-free glasses, which have an improved viscosity-liquidus relationship, and which may be readily melted and formed without unduly high production losses from devitrification. Another object of this invention is to provide glasses which may be used in the production of a wide variety of electronic devices, such as resistors, vacuum tubes, and the like, where glass to metal seals are required.

I have now found that the above and other objects may be achieved with a glass composition consisting essentially of, in weight percent: 53.5 to 59.5% $SiO_2$, 13.0 to 16.5% $Al_2O_3$, 4.0 to 9% $B_2O_3$, 8.5 to 15.5% $CaO$, 0.0 to 5.0% $MgO$ and 5.5 to 11.5% $BaO$, the ratio of $MgO$ to $BaO$ being less than about .75 and the ratio of $CaO$ to the total of $MgO$ and $BaO$ being between about 0.6 and 2.0, and the total of the $SiO_2$ $Al_2O_3$ and $B_2O_3$ being within the range of 74 to 82%. Glasses having compositions within these ranges not only are well suited for the production of seals with molybdenum metal, but, in addition have a liquidus temperature below about 1125° C. and a viscosity in excess of 30,00 poises at liquidus temperature. The particularly desirable viscosity-liquidus relationship of these glasses permits the glasses to be readily worked and used for the production of large tubing, wherein a high viscosity at liquidus temperature is required for efficient production. In the case of preferred compositions, such as composition A of Table I below, the viscosity at liquidus temperature may be as high as 100,000 poises.

In addition, the glasses of the present invention are characterized by a softening point that is greater than 850° C. and a high electrical resistivity, wherein the log of the resistivity measured at 350° C. is greater than 11.0.

The coefficient of linear thermal expansion of these glasses is between $44 \times 10^{-7}$ and $50 \times 10^{-7}$ per °C. in the 0° to 300° C. range, and they are well suited for sealing with molybdenum metal. The preferred coefficient of expansion is about $46 \times 10^{-7}$ per °C. in the range of 0° to 300° C.

The high chemical durability of the glasses of the present invention minimizes the adverse chemical effects of ambient temperatures and atmospheric conditions on glass to metal seals in electronic components and the like.

Variations in the proportions of the essential constituents of the present glasses, that is $SiO_2$, $Al_2O_3$, $B_2O_3$, $MgO$, $CaO$ and $BaO$ should be confined within the limits set forth above for the following reasons:

An undesirably low viscosity at liquidus results from an excess of $SiO_2$, $Al_2O_3$, $MgO$, $CaO$ or $BaO$, or a deficiency of $SiO_2$, $Al_2O_3$, $B_2O_3$, $CaO$ or $BaO$.

Furthermore, to attain the desired liquidus-viscosity relationship, it is important that the divalent oxides, that is, $CaO$, $MgO$ and $BaO$ be present not only within the specified limits but also within the specified ratios. A low $MgO$ content is of particular importance if the desired improvement in liquidus-viscosity relationship, over that of the prior art glasses, is to be achieved. The percentage of $MgO$ should be less than about 5% and the ratio of $MgO:BaO$ should be less than about .75. A satisfactory liquidus-viscosity relationship may be achieved in the present glasses even if the $MgO$ is omitted entirely. However, it is preferred to include from 1 to 4% $MgO$, in order to obtain a glass having the preferred linear coefficient of thermal expansion, that is, about $46 \times 10^{-7}$ cm./cm./°C. between 0° and 300° C.

If $BO_3$ is present in excess of 9%, the chemical durability of the glass is adversely affected. In addition, the presence of $B_2O_3$ in excess of the stated limit, results in a glass having a softening point below 850° C.

The advantages of the glasses of the present invention are illustrated in Table I below, wherein A, a preferred composition of the glasses of the present invention, is compared with B, a commercial, molybdenum sealing glass.

TABLE I

| | A | B |
|---|---|---|
| $SiO_2$ | 57.3 | 58.0 |
| $Al_2O_3$ | 15.0 | 15.0 |
| $B_2O_3$ | 6.0 | 4.0 |
| $CaO$ | 11.1 | 9.9 |
| $MgO$ | 3.0 | 7.1 |
| $BaO$ | 7.6 | 6.0 |
| Softening Point (° C.) | 910 | 912 |
| Annealing Point (° C.) | 705 | 708 |
| Thermal Expansion×10⁻⁷ cm./cm./° C. (0–300° C.) | 46 | 46 |
| Log R 350° C | 11.54 | 11.58 |
| Liquidus Temperature (° C.) | 1,083 | 1,140 |
| Viscosity (at Liquidus), poises | 100,000 | 18,000 |
| Chemical Durability: | | |
| 5% HCl (mg./cm.²) | 0.8 | 0.4 |
| 5% NaOH (mg./cm.²) | 0.7 | 0.3 |
| N/50 Na₂CO₃ (mg./cm.²) | 0.11 | 0.14 |

The improvement in the viscosity-liquidus relationship of glass A over glass B, and the resultant advantages, will be readily apparent to those skilled in the art. The lower liquidus temperature and higher viscosity at liquidus of glass A results in a considerable reduction of production losses due to devitrification and enables the glass to be used in the production of larger tubing. The lower liquidus temperature has been achieved with no objectionable change in softening point or annealing point. Furthermore, the preferred expansion characteristics, high resistivity and chemical durability have been retained.

The chemical durability of the glass, as shown in Table I, is expressed as the loss in weight in milligrams per square centimeter of a small polished plate of the glass after immersion for 24 hours at 95° to 100° C. in the reagent shown.

By way of further illustration, Table II shows four glass compositions, given in terms of oxide composition in weight percent as calculated from the batch, which may be employed in carrying out the present invention.

TABLE II

|  | A | B | C | D |
|---|---|---|---|---|
| $SiO_2$ | 57.5 | 59.5 | 58.0 | 56.0 |
| $Al_2O_3$ | 15.0 | 15.0 | 15.0 | 15.0 |
| $B_2O_3$ | 6.0 | 4.0 | 4.0 | 6.0 |
| CaO | 12.1 | 12.1 | 13.0 | 11.8 |
| MgO | 1.9 | 1.9 | 0.0 | 3.2 |
| BaO | 7.5 | 7.5 | 10.0 | 8.0 |
| Softening Point (° C.) | 919 | 931 | 930 | 899 |
| Annealing Point (° C.) | 708 | 723 | 727 | 704 |
| Thermal Expansion×$10^{-7}$ cm./cm./° C. (0–300° C.) | 46.7 | 46.3 | 49.0 | 48.0 |
| Log R 350° C | 11.48 | 11.42 | 11.63 | 11.95 |
| Liquidus Temperature (° C.) | 1,112 | 1,105 | 1,086 | 1,081 |

It will be appreciated that the compositions shown above may include minor amounts of conventional fining agents such as $As_2O_3$ and $Sb_2O_3$.

The preferred glasses of the present invention, such as glass A of Table I, are alkali-free. However, minor amounts of alkalies, up to about 1%, may be present as impurities or added to improve melting properties without unduly affecting the desirable properties without unduly affecting the desirable properties of the glass. The presence of alkalies in excess of about 1% may cause an objectionable decrease in the electrical resistivity of the glass.

The glasses of the present invention may be made from conventional batch ingredients and in accordance with conventional practice for hard aluminosilicate compositions. By way of specific example, the following batch composition, in approximate parts by weight of batch materials, was melted on a 16 hour melting schedule with a maximum temperature of about 1550° C. in a 15 cu. ft. platinum-lined tank, to produce the glass of composition A, Table I, above.

| | Parts |
|---|---|
| Sand | 286 |
| Calcined alumina | 75 |
| Boric acid | 53.4 |
| Dolomitic lime hydrate | 44.8 |
| Barium carbonate | 49.5 |
| Limestone | 61.0 |
| Arsenic trioxide | 2.5 |

The invention is not limited to the above examples which are given for purposes of illustration only. Variations of the invention can be made by those skilled in the art without departing from the scope or spirit of the invention. It will be apparent to those skilled in the art that the glasses of the present invention are suitable for a variety of applications, for example, as envelopes for electronic tubes, as substrate for film-type resistors or for other applications requiring a durable, low-expansion glass having high electrical resistivity.

What is claimed is:

1. A glass consisting essentially of the following calculated oxide composition, in weight percent,

| | Percent |
|---|---|
| $SiO_2$ | 53.5 to 59.5 |
| $Al_2O_3$ | 13.0 to 16.5 |
| $B_2O_3$ | 4.0 to 9.0 |
| CaO | 8.5 to 15.0 |
| MgO | 0.0 to 5.0 |
| BaO | 5.5 to 11.5 | the ratio of MgO to BaO being less than about .75, the ratio of CaO to the total of MgO and BaO being between about 0.6 and 2.0, the total of the $SiO_2$, $Al_2O_3$ and $B_2O_3$ being between 74 and 82%, the coefficient of linear thermal expansion of the glass being between $44 \times 10^{-7}$ and $50 \times 10^{-7}$ per ° C. between 0° and 300° C., the softening point being greater than 850° C., the liquidus temperature being below 1125° C. and the viscosity at the liquidus temperature being greater than about 30,000 poises.

2. The glass according to claim 1 wherein said MgO is present in an amount of from about 1 to 4% by weight.

3. The glass of claim 1, wherein said composition is substantially alkali-free.

4. A glass consisting essentially of the following calculated oxide composition, in weight percent,

| | Percent |
|---|---|
| $SiO_2$ | 57.3 |
| $Al_2O_3$ | 15.0 |
| $B_2O_3$ | 6.0 |
| CaO | 11.1 |
| MgO | 3.0 |
| BaO | 7.6 |

5. A glass consisting of, in weight percent,

| | Percent |
|---|---|
| $SiO_2$ | 53.5 to 59.5 |
| $Al_2O_3$ | 13.0 to 16.5 |
| $B_2O_3$ | 4.0 to 9.0 |
| CaO | 8.5 to 15.0 |
| MgO | 0.0 to 5.0 |
| BaO | 5.5 to 11.5 | the ratio of MgO to BaO being less than about .75, the ratio of CaO to the total of MgO and BaO being between about 0.6 and 2.0, the total of the $SiO_2$, $Al_2O_3$ and $B_2O_3$ being between 74 and 82%, the coefficient of linear thermal expansion of the glass being between $44 \times 10^{-7}$ and $50 \times 10^{-7}$ per ° C. between 0° and 300° C., the softening point being greater than 850° C., the liquidus temperature being below 1125° C. and the viscosity at the liquidus temperature being greater than about 30,000 poises.

References Cited by the Examiner

UNITED STATES PATENTS 2,571,074   10/1951   Tiede _____ 106—54

FOREIGN PATENTS 585,282   2/1947   Great Britain.

TOBIAS E. LEVOW, *Primary Examiner.*

HELEN M. McCARTHY, *Examiner.*